US012754736B2

(12) United States Patent
Vrabel

(10) Patent No.: US 12,754,736 B2
(45) Date of Patent: Oct. 6, 2026

(54) VECTOR BITWISE ROTATIONS

(71) Applicant: Imagination Technologies Limited, Kings Langley (GB)

(72) Inventor: Peter Vrabel, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 83 days.

(21) Appl. No.: 19/017,016

(22) Filed: Jan. 10, 2025

(65) Prior Publication Data

US 2025/0321737 A1 Oct. 16, 2025

(30) Foreign Application Priority Data

Jan. 10, 2024 (GB) ...................................... 2400323

(51) Int. Cl.

*G06F 9/30* (2018.01)
*G06F 5/01* (2006.01)
*G06F 7/76* (2006.01)

(52) U.S. Cl.

CPC ............ *G06F 9/30032* (2013.01); *G06F 5/01* (2013.01); *G06F 7/76* (2013.01); *G06F 9/30036* (2013.01)

(58) Field of Classification Search

CPC ..... G06F 9/30032; G06F 9/30036; G06F 5/01
See application file for complete search history.

(56) References Cited

U.S. PATENT DOCUMENTS 6,327,651 B1 * 12/2001 Dubey .................... G06F 7/766 712/300
2007/0088772 A1 4/2007 Nunes et al.
2007/0124631 A1 5/2007 Boggs et al.
2010/0318771 A1 * 12/2010 Sudhakar .............. G06F 9/3891 712/E9.034
2014/0101358 A1 4/2014 Kaltenbach et al.
2015/0134937 A1 * 5/2015 Rubinstein .......... G06F 9/30036 712/225

FOREIGN PATENT DOCUMENTS

KR 20080049825 A 6/2008

OTHER PUBLICATIONS

Agarwal et al; “A 260mV 468GOPS/W 256b 4-way to 32-way vector shifter with permute-assisted skip in 22nm tri-gate CMOS”; ESSCIRC (ESSCIRC), 2012 Proceedings of the, IEEE; Sep. 17, 2012; pp. 177-180.

* cited by examiner

*Primary Examiner* — Courtney P Spann

(74) *Attorney, Agent, or Firm* — Potomac Law Group, PLLC; Vincent M DeLuca

(57) ABSTRACT

A computer-implemented method for performing a vector bitwise rotation, wherein a processing system comprises a byte-wise anything-to-anything mux and one or more bit-wise right shifters, wherein the byte-wise anything-to-anything mux includes a plurality of byte-sized inputs and a plurality of byte-sized outputs, each input being associated with a respective input position and each output being associated with a respective output position. A combination of a byte-wise anything-to-anything mux and one or more bitwise shifts is used to perform vector bitwise rotations, with even and odd elements of the vector operated on separately.

20 Claims, 7 Drawing Sheets

FIGURE 7
abcdefgh ijklmnop ABCDEFGH 01234567
1 byte
ijklmnop abcdefgh xxxxxxxx abcdefgh
2-bits
ghijklmn opabcdef xxxxxxxx xxxxxxxx
Processing odd elements
abcdefgh ijklmnop ABCDEFGH 01234567
0 bytes
xxxxxxxx 01234567 ABCDEFGH 01234567
7-bits
xxxxxxxx xxxxxxxx 1234567A BCDEEFGH0
Processing even elements
Half-word-wise
3 2 1 0 Index

VECTOR BITWISE ROTATIONS

CROSS-REFERENCE TO RELATED APPLICATIONS AND CLAIM OF PRIORITY

This application claims foreign priority under 35 U.S.C. 119 from United Kingdom patent application No. GB2400323.8 filed on 10 Jan. 2024, the contents of which are incorporated by reference herein in their entirety.

TECHNICAL FIELD

The present disclosure relates to the processing of vector bitwise rotations by a processing system.

BACKGROUND

Vector bitwise rotation instructions typically involve reading data from a register, dividing the data into multiple elements (i.e. sequences of bits), performing a bitwise rotation of each element, and writing the result back to a register. Vector bitwise rotation instructions are required to perform, inter alia, certain cryptographic operations. Currently, additional dedicated logic in the form of a bitwise reverse logic for each supported element size is required to implement vector bitwise rotation instructions. This is costly from an area perspective.

SUMMARY

This Summary is provided merely to illustrate some of the concepts disclosed herein and possible implementations thereof. Not everything recited in the Summary section is necessarily intended to be limiting on the scope of the disclosure. Rather, the scope of the present disclosure is limited only by the claims.

The present invention uses a combination of a byte-wise anything-to-anything mux (i.e. multiplexer) and one or more bitwise shifts to perform vector bitwise rotations. CPUs typically have an existing byte-wise anything-to-anything mux as they are required for other purposes. Therefore the addition of the bitwise shifts is less costly overall compared to the existing dedicated bitwise rotate logic that would otherwise be required to implement vector bitwise rotations. In addition, the combination of the byte-wise anything-to-anything mux and the additional bitwise shifts requires less power than would be used by the dedicated logic currently required.

According to one aspect disclosed herein, there is provided a computer-implemented method for performing a vector bitwise rotation. A processing system comprises a byte-wise anything-to-anything mux and one or more bitwise right shifters The byte-wise anything-to-anything mux comprises a plurality of byte-sized inputs and a plurality of byte-sized outputs, each input being associated with a respective input position and each output being associated with a respective output position. The method comprises processing an instruction to perform a vector bitwise rotation on a vector of elements, each element comprising one or more bytes of data and being associated with a respective even or odd index, wherein the respective index alternates between even and odd for successive elements of the vector, starting with an even index for an initial element of the vector. The instruction specifies a respective rotation distance to be applied to each respective element. Processing the instruction comprises inputting a respective byte of each element to a respective input of the mux. The method comprises, for each element associated with a respective even index, copying one or more bytes of the element to a respective output of the mux based on the respective rotation distance, duplicating a right-most byte of the one or more copied bytes of the element at a respective next available output position to the left or, if a respective output position to the left is unavailable, at a respective available right-most position, and generating a shifted element by applying a respective bitwise shift to the one or more copied bytes using the duplicated right-most byte, wherein the respective bitwise shift is based on the respective rotation distance. The method further comprises, for each element associated with a respective odd index, copying one or more bytes of the element to a respective output of the mux based on the respective rotation distance, duplicating a right-most byte of the one or more copied bytes of the element to a respective next available output position to the left or, if a respective output position to the left is unavailable, at a respective available right-most output position, and generating a shifted element by applying a respective bitwise shift to the one or more copied bytes using the duplicated right-most byte, wherein the respective bitwise shift is based on the respective rotation distance. The method further comprises outputting a resulting sequence of elements using each of the shifted elements.

According to another aspect disclosed herein, there is provided a computer-implemented method for performing a vector bitwise rotation. According to this aspect, a processing system comprises a byte-wise anything-to-anything mux and one or more bitwise left shifters, wherein the byte-wise anything-to-anything mux comprises a plurality of byte-sized inputs and a plurality of byte-sized outputs, each input being associated with a respective input position and each output being associated with a respective output position. The comprises processing an instruction to perform a vector bitwise rotation on a vector of elements, each element comprising one or more bytes of data and being associated with a respective even or odd index, wherein the respective index alternates between even and odd for successive elements of the vector, starting with an even index for an initial element of the vector, wherein the instruction specifies a respective rotation distance to be applied to each respective element. Processing the instruction comprises inputting a respective byte of each element to a respective input of the mux. The method comprises, for each element associated with a respective even index, copying one or more bytes of the element to a respective output of the mux based on the respective rotation distance, duplicating a left-most byte of the one or more copied bytes of the element at a respective next available output position to the right, if a respective output position to the right is unavailable, at a respective available left-most output position, and generating a shifted element by applying a respective bitwise shift to the one or more copied bytes using the duplicated left-most byte, wherein the respective bitwise shift is based on the respective rotation distance. The method further comprises for each element associated with a respective odd index, copying one or more bytes of the element to a respective output of the mux based on the respective rotation distance, duplicating a left-most byte of the one or more copied bytes of the element at a respective next available output position to the right or, if a respective output position to the right is unavailable, at a respective available left-most output position, and generating a shifted element by applying a respective bitwise shift to the one or more copied bytes using the duplicated left-most byte, wherein the respective bitwise shift is based on the respective rotation distance. The method further comprises outputting a resulting sequence of elements using each of the shifted elements.

In embodiments, the method may comprise a) first processing the instruction for each element associated with a respective even index, and then processing the instruction for each element associated with a respective odd index, or b) first processing the instruction for each element associated with a respective odd index, and then processing the instruction for each element associated with a respective even index.

In embodiments, the respective rotation distance for one or more elements may be less than one byte, and wherein the respective bitwise shift is equal to the respective rotation distance.

In embodiments, the respective rotation distance for one or more elements may be one byte or more than one byte, and wherein the respective bitwise shift is equal to the respective rotation distance modulo by one byte.

In embodiments, one or more of the respective rotation distances may be the same. Additionally or alternatively, one or more of the respective rotation distances may be different.

In embodiments, each element may consist of a single byte of data. Alternatively, each element may comprise multiple bytes of data.

In embodiments, inputting the respective byte of each element may comprise supplying the respective byte of each element to the respective inputs of the mux from a register.

In embodiments, outputting the resulting sequence of elements may comprise outputting the resulting sequence of elements to a register.

The instruction to perform the vector bitwise rotation is split into two micro-operations (micro-ops), one for the even elements of the vector (e.g. the 0th, 2nd, 4th, etc. elements) and one for the odd elements of the vector (e.g. 1st, 3rd, 5th, etc. elements). The even elements are operated on together, and the odd elements are operated on together, but separately from the even elements.

For rotations less than one byte, the even elements input to the mux are output at the same position of the mux (i.e. the element is output at an output position that is the same as the input position that the element is input). In the case where the bitwise shifts implement right shifts, then the right-most byte of the even elements are also copied into the adjacent position to the left at the output of the mux. In the case where the bitwise shifts implement left shifts, then the left-most byte of the even elements are also copied into the adjacent position to the right at the output of the mux, with the left-most byte of the right-most element copied to the left-most byte output of the mux instead. The bitwise rotation specified in the instruction are then applied to the individual even elements by the right or left shifter, using the element that was copied into the associated adjacent position. Only the resulting even elements are used for the final result. Then, the odd elements input to the mux are output at the same position of the mux. In the case where the bitwise shifter implements right shifts, then the right-most byte of the odd elements are also copied into the adjacent position to the left at the output of the mux, with the right-most byte of the left-most element being copied to the right-most output position of the mux instead. In the case where the bitwise shifts implement left shifts, then the left-most byte of the odd elements are also copied into the adjacent position to the right at the output of the mux. The bitwise rotation specified in the instruction are then applied to the individual odd elements by the right or left shifter, using the element that was copied into the associated adjacent position. Only the resulting odd elements are used for the final result.

For rotations of one byte or more, the even elements input to the mux are output at the rotated position (e.g. rotated by one byte) of the mux, copying the resulting right-most or left-most byte of the result of each rotated element into the adjacent position to the left or right at the output of the mux, depending on whether right or left shifts are applied, respectively, as described above. The shifter is then used to apply the remaining shift. Only the resulting even elements are used for the final result. For example, if the rotation instruction specifies a bitwise rotation of nine bits, the even elements are first rotated by one byte by the mux, and then the remaining one bit rotation is performed by the shifter. The same process is repeated for the odd elements. Again, only the resulting odd elements are used for the final result.

Note that whilst the above process is described in terms of the even elements being processed first followed by the odd elements, the odd elements may instead be processed first.

According to another aspect disclosed herein, there is provided a processing system for performing a vector bitwise rotation, wherein the processing system comprises a byte-wise anything-to-anything mux and one or more bitwise right shifters, wherein the byte-wise anything-to-anything mux comprises a plurality of byte-sized inputs and a plurality of byte-sized outputs, each input being associated with a respective input position and each output being associated with a respective output position. The processing system is configured to process an instruction to perform a vector bitwise rotation on a vector of elements, each element comprising one or more bytes of data and being associated with a respective even or odd index, wherein the respective index alternates between even and odd for successive elements of the vector, starting with an even index for an initial element of the vector, wherein the instruction specifies a respective rotation distance to be applied to each respective element. The processing system is configured to input a respective byte of each element to a respective input of the mux. For each element associated with a respective even index: the mux is configured to copy the one or more bytes of the element to a respective output of the mux based on the respective rotation distance, and duplicate a right-most byte of the copied bytes to a respective next available output position to the left or, if a respective output position to the left is unavailable, at a respective available right-most position, and each bitwise shifter is configured to generate a shifted element by applying a respective bitwise shift to the copied bytes using the duplicated right-most byte, wherein the respective bitwise shift is based on the respective rotation distance. For each element associated with a respective odd index: the mux is configured to copy the one or more bytes of the element to a respective output of the mux based on the respective rotation distance, and duplicate a right-most byte of the copied bytes to a respective next available output position to the left or, if a respective output position to the left is unavailable, at a respective available right-most position, and each bitwise shifter is configured to generate a shifted element by applying a respective bitwise shift to the copied bytes using the duplicated right-most byte, wherein the respective bitwise shift is based on the respective rotation distance. The processing system is further configured to output a resulting sequence of elements using each of the shifted elements.

According to another aspect disclosed herein, there is provided a processing system for performing a vector bitwise rotation, wherein the processing system comprises a byte-wise anything-to-anything mux and one or more bitwise left shifters, wherein the byte-wise anything-to-anything mux comprises a plurality of byte-sized inputs and a plurality of byte-sized outputs, each input being associated with a respective input position and each output being associated with a respective output position. The processing system is configured to process an instruction to perform a vector bitwise rotation on a vector of elements, each element comprising one or more bytes of data and being associated with a respective even or odd index, wherein the respective index alternates between even and odd for successive elements of the vector, starting with an even index for an initial element of the vector, wherein the instruction specifies a respective rotation distance to be applied to each respective element. The processing system is configured to input a respective byte of each element to a respective input of the mux. For each element associated with a respective even index: the mux is configured to copy the one or more bytes of the element to a respective output of the mux based on the respective rotation distance, and duplicate a left-most byte of the one or more copied bytes of the element at a respective next available output position to the right or, if a respective output to the right is unavailable, at a respective available left-most output position, and each bitwise shifter is configured to generate a shifted element by applying a respective bitwise shift to the copied bytes using the duplicated left-most byte, wherein the respective bitwise shift is based on the respective rotation distance. For each element associated with a respective odd index: the mux is configured to copy the one or more bytes of the element to a respective output of the mux based on the respective rotation distance, and duplicate a left-most byte of the one or more copied bytes of the element at a respective next available output position to the right or, if a respective output position to the right is unavailable, at a respective available left-most output position, and each bitwise shifter is configured to generate a shifted element by applying a respective bitwise shift to the copied bytes using the duplicated left-most byte, wherein the respective bitwise shift is based on the respective rotation distance. The processing system is further configured to output a resulting sequence of elements using each of the shifted elements.

The processing system may be embodied in hardware on an integrated circuit. There may be provided a method of manufacturing, at an integrated circuit manufacturing system, a processing system. There may be provided an integrated circuit definition dataset that, when processed in an integrated circuit manufacturing system, configures the system to manufacture a processing system. There may be provided a non-transitory computer readable storage medium having stored thereon a computer readable description of a processing system that, when processed in an integrated circuit manufacturing system, causes the integrated circuit manufacturing system to manufacture an integrated circuit embodying a processing system.

There may be provided an integrated circuit manufacturing system comprising: a non-transitory computer readable storage medium having stored thereon a computer readable description of the processing system; a layout processing system configured to process the computer readable description so as to generate a circuit layout description of an integrated circuit embodying the processing system; and an integrated circuit generation system configured to manufacture the processing system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
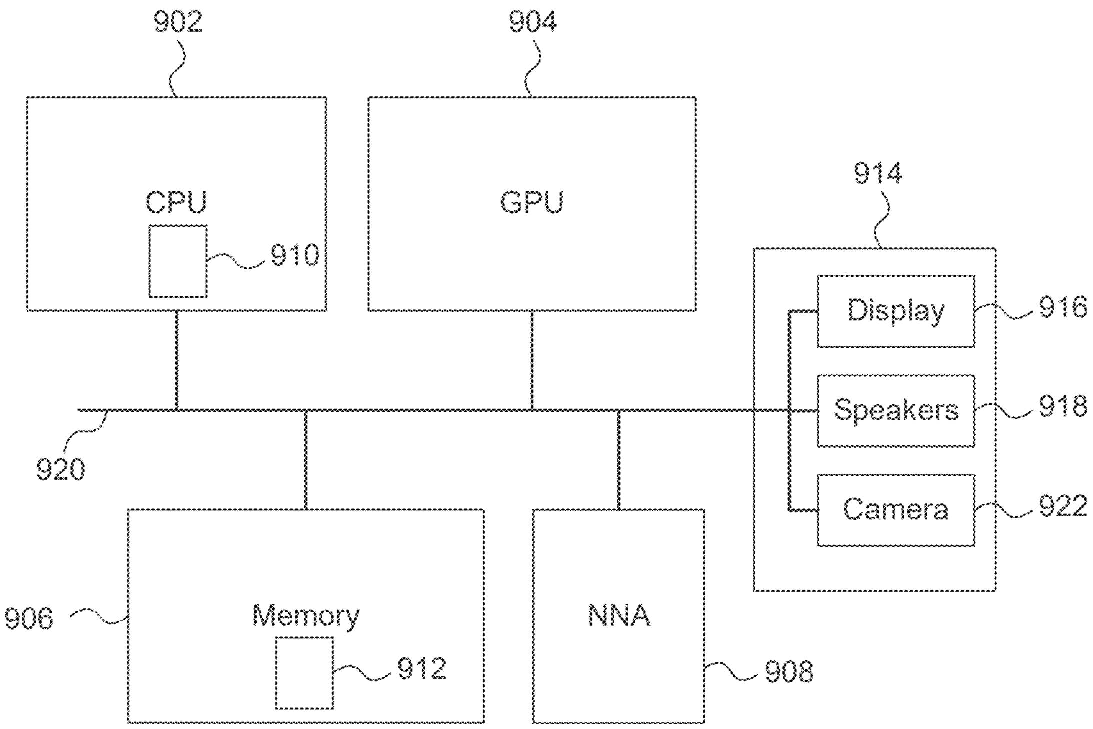
FIG. 1 shows a computer system in which a graphics processing system is implemented.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Figure 3:
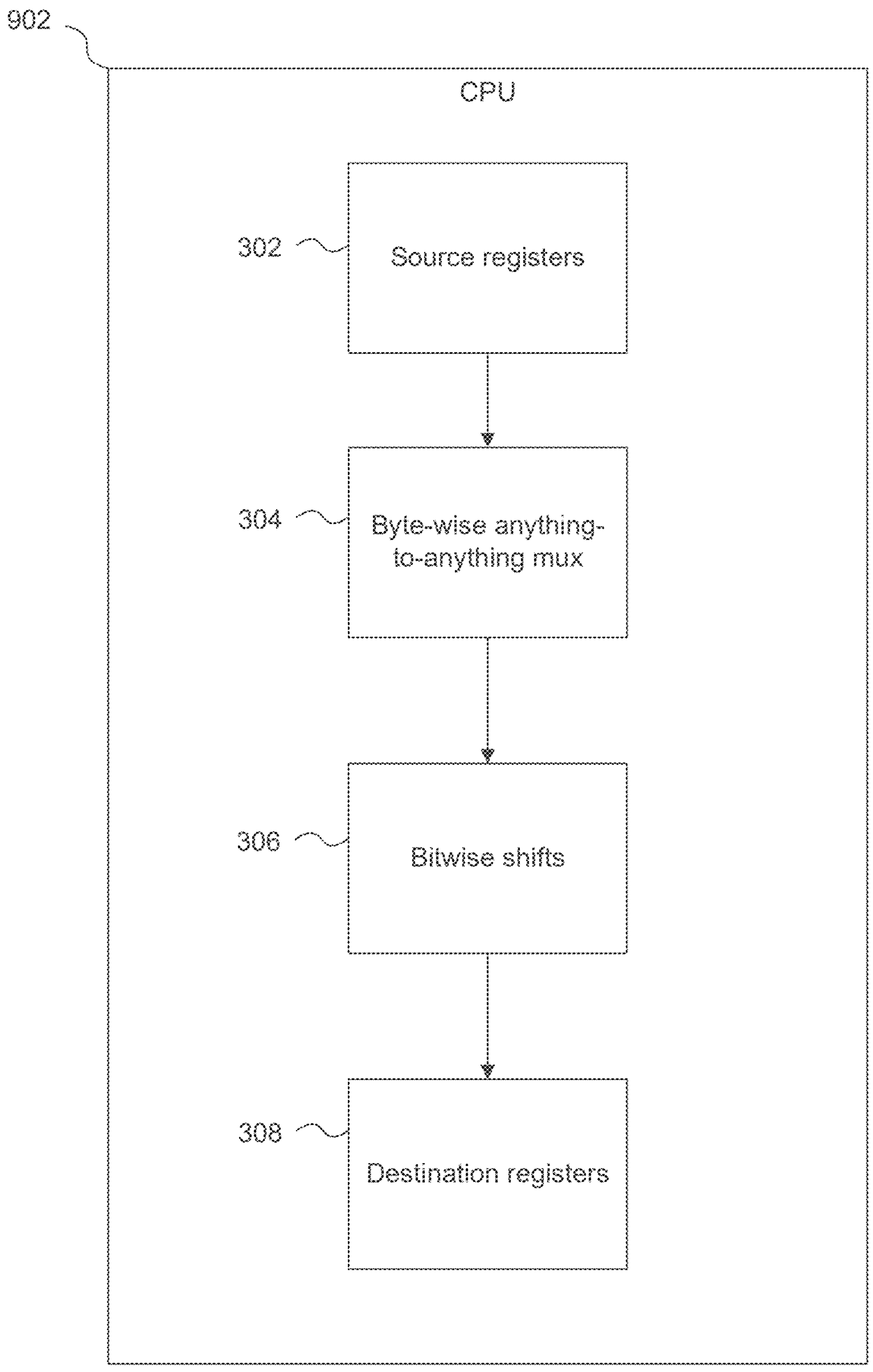
FIG. 3 shows an example processing system for performing vector bitwise rotations.

Embodiments disclosed herein enable vector bitwise operations to be performed by a processing system. FIG. 3 illustrates an example configuration of components of a processing system for performing said operations. In this example, the CPU 902 comprises one or more source registers 302, a byte-wise anything-to-anything mux 304, one or more bitwise shifts (or bitwise shifters) 306, and one or more destination registers 308. The components may be connected to each other directly, as shown in FIG. 3. Alternatively, there may be one or more additional components between one or more of the components, e.g. between the mux 304 and the shifts 306. It should be appreciated that this is merely one example configuration and that other configurations and arrangements are possible. For example, the source registers 302 and destinations registers 308 are shown as part of the CPU 902 in FIG. 3, but either or both may be sperate from the CPU 902, e.g. as part of memory 902 in the example processing system of FIG. 1.

The byte-wise anything-to-anything mux 304 has a plurality of inputs and a plurality of outputs. Each input and output is configured to accept (i.e. hold, store, etc.) one byte of data. Each input and output is associated with a respective position, i.e. each input has an input position and each output has an output position. The mux 304 itself includes a plurality of components that connect each of the inputs to each of the outputs. The mux 304 may be configured to accept data directly from the source registers 302 (e.g. as shown in FIG. 1), or from an intermediate source, i.e. storage between the source registers 302 and the mux 304. The mux 304 may be configured to output data directly to the bitwise shifts 306, or to an intermediate source, i.e. storage between the mux 304 and the bitwise shifts 306. In some examples, the mux 304 may include temporary storage inside the mux 304. This may be required in order to meet timing constraints. The mux 304 is configured to output any of the input data bytes at any output of the mux 304, e.g. the data at the first input of the mux 304 may be output at any output (e.g. the second or third output) of the mux 304.

Each bitwise shift 306 is configured to shift at least two bytes of data, and to output the lowest byte of data. The data may be output directly to the destination registers 308. As another option, the data output by each bitwise shift 306 may be muxed together with some other sources before being stored in a register. Each bitwise shift 306 may be configured to accept data directly from the mux 304, or from an intermediate storage. Each bitwise shift 306 is configured to either left shift the input data or right shift the input data.

Figure 4:
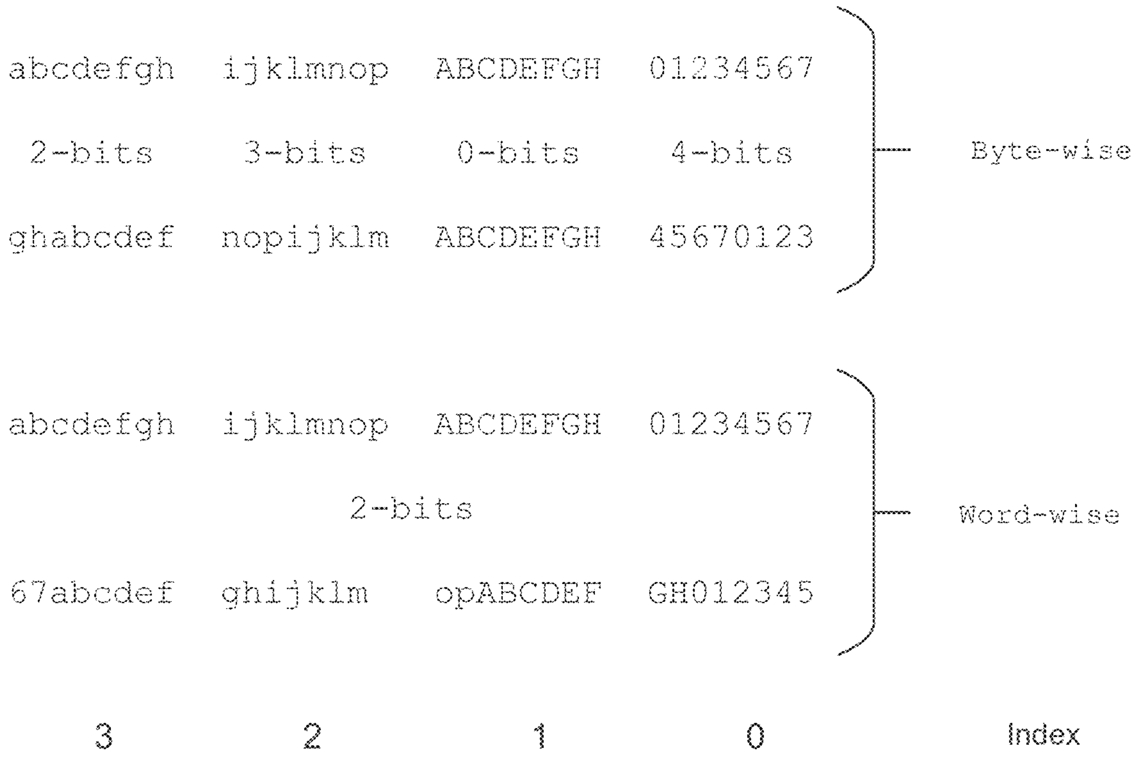
FIG. 4 shows example vector bitwise rotations.

Vector bitwise rotations will now be described with reference to FIGS. 4 to 7. FIG. 4 illustrates the desired results of example vector bitwise rotations. In the upper half of FIG. 4, vector bitwise rotations are applied byte-wise on a vector of elements. This changes the order of bits within an element, without changing which bits are present in the element overall. The input vector is shown in the first row of FIG. 4. In this example, each element is one byte in size, and a different rotation (shown on the second row of FIG. 4) is applied to each element. Each element is associated with an index. The indices associated with columns of elements are shown at the bottom of FIG. 4. The index system starts at index 0 and increases right-to-left. A 4-bit rotation is applied to the element at index 0, a 0-bit rotation (i.e. no rotation) is applied to the element at index 1, a 3-bit rotation is applied to the element at index 2, and a 2-bit rotation is applied to the element at index 3. The resulting output vector is shown on the third row of FIG. 4. So, for example, in the element at index 3 the last two bits ('gh') become the first two bits following the 2-bit rotation, and the other bits ('abcdef') are shifted up by two bits, but each original bit is still present in the output. In the lower half of FIG. 4, vector bitwise rotations are applied word-wise (i.e. four bytes) on a vector of elements. In this example, the input vector is shown in the first row of the bottom half of FIG. 4 and the same 2-bit rotation (shown in the second row of the bottom half of FIG. 4) is applied to each element to produce the output vector shown in the third row of the bottom half of FIG. 4. In this type of rotation, the bits present in each element will change (unless the rotation brings all the elements back to their starting position). In the example in the bottom half of FIG. 4, shifting the whole word by 2 bits results in the last two bits of each of the elements at indices 1, 2 and 3 being shifted into the first two bits of the element at index 0 (e.g. the final two bits 'gh' of the element at index 3 are shifted into the first two bits of the element at index 2), with the final two bits of the element at index 1 becoming the first two bits of the element at index 0. So, in this example, the rotation results in each output element containing some of the original bits from the corresponding input element (e.g. 'abcdef' for the element at index 3), although in a different position, and some new bits (e.g. '67' for the element at index 3). A large enough rotation can result in each bit in an output element being a new bit compared to the corresponding input element.

In embodiments, a vector (i.e. a sequence of elements) is stored in a register file. The vector may be of any length, but will be a large power of 2 bytes (typically a large power). The size of the element is defined by the instruction processed by the CPU 902. For a given instruction, each element (i.e. a number of bits) is the same size, e.g. each element may be 8 bits. Each element will be a power of 2 bytes. For example, for a 128-bit vector, one instruction might interpret the vector as sixteen 8-bit elements, or eight 16-bit elements, or four 32-bit elements, or eight 64-bit elements. Each element in the sequence is associated with an even or odd index, starting with zero. The CPU 902 receives an instruction specifying the elements to rotate and the distance to rotate each element by. Rotations are applied to the even elements first and then the odd elements, or vice versa. This is necessary because of the need to duplicate elements at the output of the mux.

Rotations may be applied bit-wise, meaning each 8-bit element is rotated by a number of bits. The rotation applied to each element may be the same or different. Rotations may be applied to more than one byte's worth of elements, e.g. two elements (half-word-wise rotation) or four elements (word-wise rotation).

Figure 5:
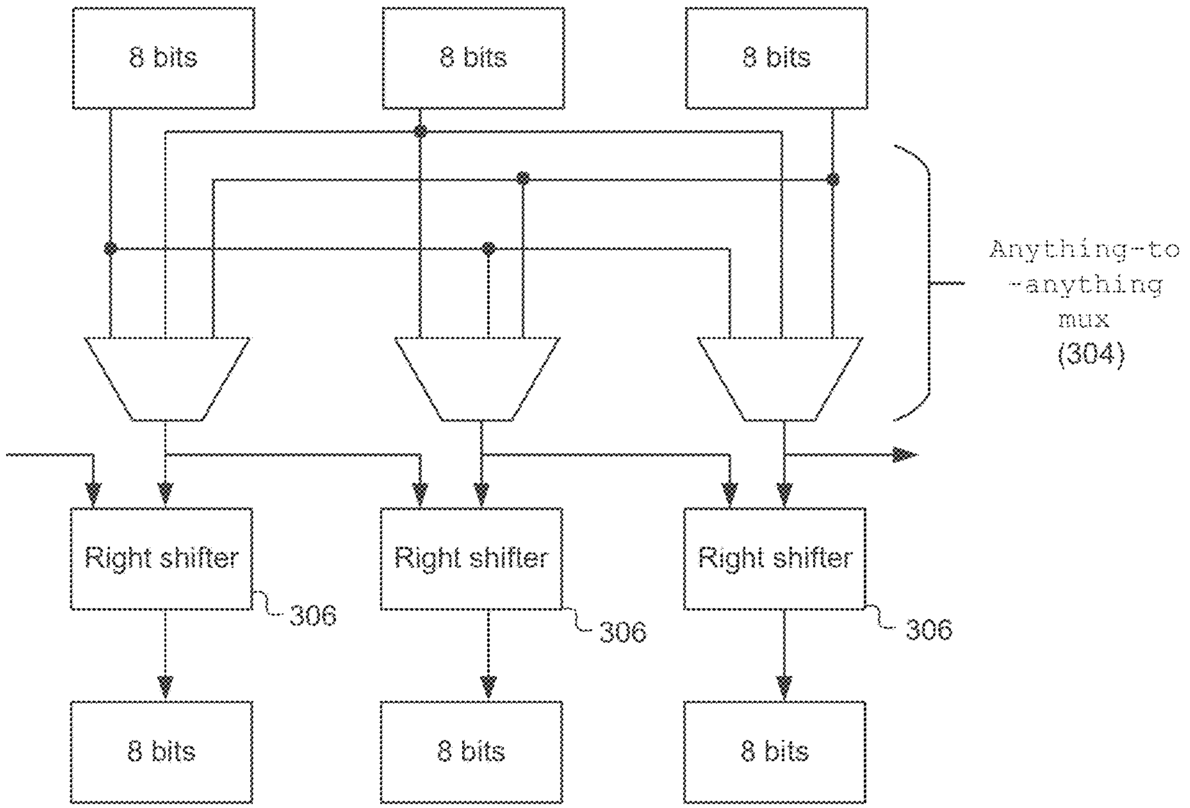
FIG. 5 shows an example configuration of anything-to-anything mux and bitwise shifters for performing vector bitwise rotations.

FIG. 5 illustrates an example configuration of an anything-to-anything mux 304 and bitwise shifters 306. In this example, the shifters 306 are right shifters. In this example, three 8-bit elements are input to the mux 304. Each output of the mux 304 is connected to a right shifter 306. Left shifters may be used instead.

In general, the CPU 902 is configured to receive and process a vector bitwise rotation instruction. Processing the instruction includes determining which vector of elements to input (e.g. from the source registers 302) to the mux 304 and the size of these elements, with separate bytes of the vector input to separate inputs of the mux 304. Each byte is input at an input of the mux 304 having an input position, a 0th byte (or byte 0) of the vector is input to the 0th input (or input 0) of the mux, a 1st byte is input the 1st input of the mux 304, and so on. Even and odd elements are processed independently, e.g. even first, then odd, or odd first, then even. Starting, for example, with the even elements. The mux 304 is configured to output the even elements at an output of the mux 304 based on a rotation distance specified by the instruction. If the rotation distance is less than one byte, each byte of the element is output at an output of the mux 304 having an output position corresponding to the input position of the input at which the byte was input to the mux 304, e.g. the 2nd byte at the 2nd input is output to the 2nd output. Still considering the situation in which the rotation distance is less than one byte, if the rotation is applied to more than one bytes worth of data (e.g. a half-word of data), the byte of data at the 2nd input will be output at the 2nd output of the mux 304. In other words, it is the elements (which may be more than one byte) that are associated with an even or odd index, and not the bytes of data. If the rotation distance is more than one byte, each byte of the element is output at an output of the mux 304 having an output position that is based on the rotation distance, e.g. if the rotation distance is between one and two bytes, the bytes are rotated by one position (i.e. the byte is output at an output having an output position one higher than the input position of the input holding that byte), or if the rotation distance is between two and three bytes, the bytes are rotated by two positions (i.e. the byte is output at an output having an output position two higher than the input position of the input holding that byte), and so on. The bytes output to these outputs may be said to be output to "first outputs" of the mux 304, where "first" is used here as a distinguishing label as opposed to meaning "initial" or "starting". In addition, in the case where the bitwise shifts are configured to implement rights shifts, the right-most byte of the output element (i.e. the lowest byte in a right-to-left indexed system) is also copied into the next available output of the mux 304 to the left (that is, the next available output having a higher (i.e. greater) position than the output holding (i.e. storing) the lowest byte in a right-to-left indexed system). In the case where the bitwise shifts are configured to implement left shifts, the left-most byte of the output element (i.e. the highest byte in a right-to-left indexed system) is also copied into the next available output of the mux 304 to the right (that is, the next available output having a lower (i.e. smaller) position than the output holding (i.e. storing) the highest byte in a right-to-left indexed system). The bytes copied to these outputs may be said to be output to "second" outputs of the mux 304. Note that there is no physical distinction between the first and second outputs.

Then, the bitwise shifts 306 are configured to apply either a right or left bitwise shift to the bytes stored at the first outputs of the mux 304 (i.e. the bytes output to the mux 304 based on the initial rotation) by rotating the byte stored at a first output using the copied byte stored at the second output of the mux 304. The byte at the first output is shifted by the remaining shift specified by the rotation instruction. The remaining shift is the difference between the rotation distance and a whole number of bytes. For example, the rotation distance may be 11 bits, such that the remaining shift applied by the bitwise shifts is 3 bits. The shifted bytes having the same position as those of the even elements are used for the final, rotated vector. The other bytes (i.e. those having positions corresponding to the odd elements) are discarded, Note that a different rotation distance may be specified for each element, or some elements may have the same rotation distance.

The same process if then repeated for the odd elements (or the even elements if the odd elements were processed first). Again, only the shifted bytes having positions corresponding to the bytes of the odd elements are used for the final result. The final result is output (directly or indirectly) to a destination register 308.

Figure 6:
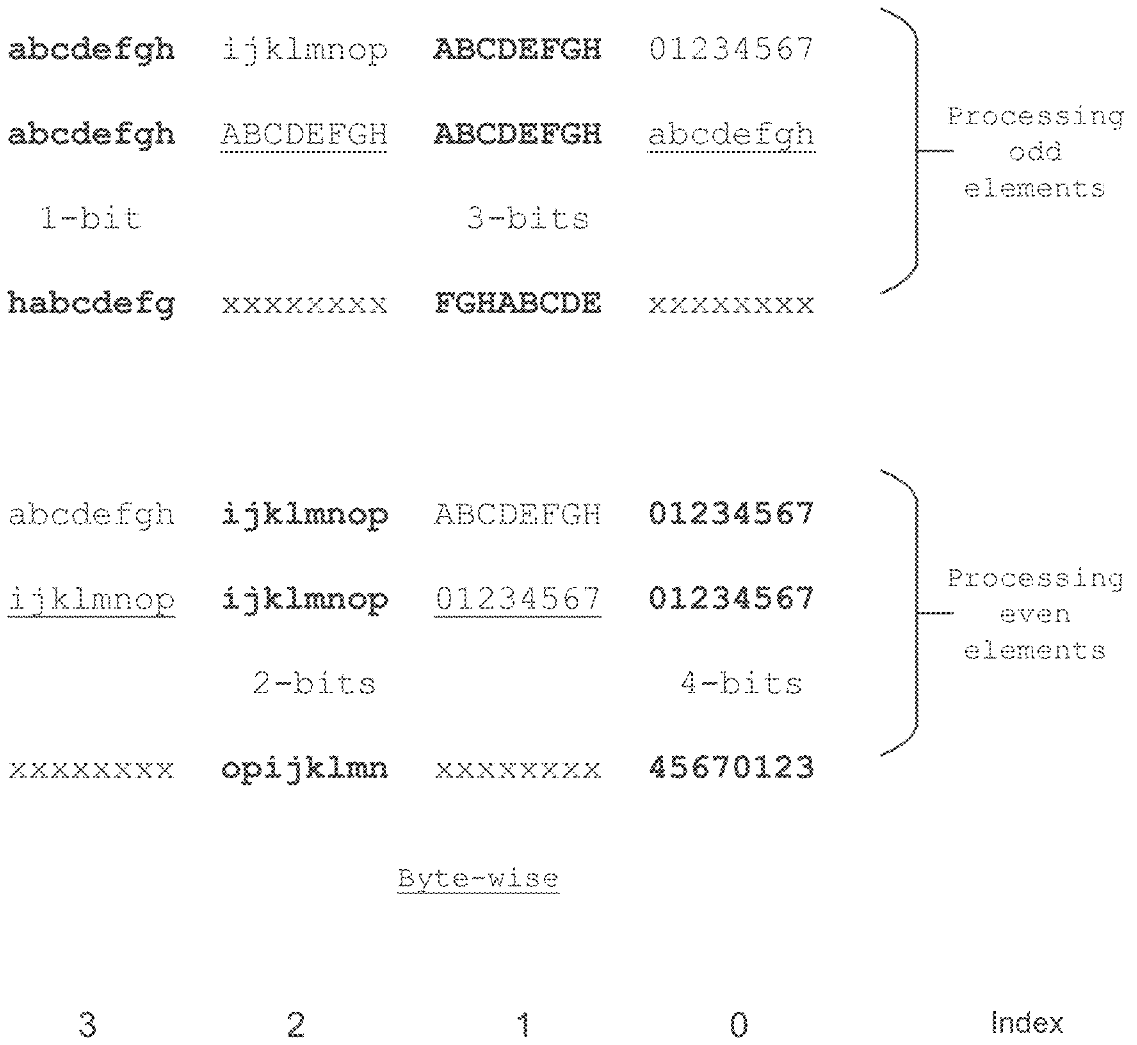
FIGS. 6 and 7 each show example vector bitwise rotations performed according to the embodiments described herein.
Figure 7:

FIGS. 6 and 7 show two example vector bitwise rotations using the general process described above. In FIG. 6, rotations are applied byte-wise, i.e. a rotation is applied to each byte worth of data. Each element is one byte in size. In this example, as shown in the first row of (both the top half and the bottom half of) FIG. 6, element 0 is "01234567" (input at input 0 of the mux), element 1 is "ABCDEFGH" (input at input 1), element 2 is "ijklmno" (input at input 2) and element 3 is "abcdefgh" (input at input 3). Note that each character within an element, e.g. "a" of element "abcdefgh", and "3" of element "01234567" represents one bit. The rotation distance to be applied to element 0 is 4 bits, the rotation distance to be applied to element 1 is 3 bits, the rotation distance to be applied to element 2 is 2-bits, and the rotation distance to be applied to element 3 is 1 bit. The rotation distances for the odd elements are shown in the third row of the top half of FIG. 6, and the rotation distances for the even elements are shown in the third row of the bottom half of FIG. 6. The odd elements are processed first in this example. The odd elements are shown in bold type in the first row. Since each rotation distance is less than one byte, the odd elements (which are one byte in size in this example) are output at the corresponding position of the mux (the positions are numbered from right-to-left), i.e. element 1 at input 1 is output at output 1 of the mux and element 3 at input 3 of the mux is output at output 3 of the mux. The elements output at the same position are shown in bold type in the second row. In addition, the right-most byte (the lowest byte in this example) of each odd element is copied into the next available output to the left (i.e. the next available higher output in this example). Therefore, in this example in which each element is a single byte, element 1 at output 1 of the mux is copied to the next available output position to the left (i.e. the next available output having a higher position), which is output 2 since output 2 (the next higher output) is available. Element 3 at output 3 is copied to the next available output position to the left (i.e. the next available output having a higher position), which in this case involves wrapping around to the right-most available output, output 0, since there is no output to the left (i.e. no higher output) available. The elements copied into the next available output are shown underlined. The bitwise shifts are then applied. The element at output 1 is shifted by 3 bits using the same element that was copied to output 2 of the mux. The element at output 3 is shifted by 1 bit using the same element that was copied to output 0 of the mux. The elements at the positions corresponding to the initial odd elements (i.e. the elements at positions 1 and 3) are output to form the final result. The elements used for the final result are shown in bold type in the fourth row.

The even elements are then processed. The even elements are shown in bold type in the first row of the lower half of FIG. 6. Again, since the rotation distances are less than one byte, the even elements are output at a position corresponding to the input position of those elements, i.e. the even element at input position 0 is output at output position 0 and the even element at input position 2 is output at output position 2. The elements output at the same position are shown in bold type. As with the odd elements, the right-most byte (the lowest byte in this example) of each even element is copied into the next available output position to the left (i.e. the next available output having a higher position), which in this example (in which each element is a single byte) means the even element at output 0 is copied to output 1 (since output 1 is available) and the even element at output is 2 is copied to output 3 (since output 3 is available). The copied elements are shown underlined in the second row. The shifts are then applied. The element at output 0 is shifted by 4 bits using the same element that was copied to output 1 of the mux. The element at output 2 is shifted by 2 bits using the same element that was copied to output 3 of the mux. The elements at the positions corresponding to the initial even elements (i.e. the elements at positions 0 and 2) are output to form the final result. The shifted elements used for the final result are shown in bold type in the fourth row.

Note that FIG. 6 uses right bitwise shifters to right shift the elements. In contrast, if left bitwise shifters were used to left shift the elements, rather than copying the right-most (i.e. lowest, in the FIG. 6 example) byte of each element into the next available position to the left (i.e. next available higher position, in the FIG. 6 example) of the mux, the left-most (i.e. highest) byte of each element would be copied into the next available position to the right (i.e. next available lower position) of the mux.

In FIG. 7, rotations are applied half-word-wise, i.e. a rotation is applied to two bytes worth of data. Each element is two bytes in size. In this example, as shown in the first row of (both the top half and the bottom half of) FIG. 7, element 0 is "ABCDEFGH 01234567" (input at inputs 1 and 0 respectively), and element 1 is "abcdefgh ijklmnop" (input at inputs 3 and 2 respectively). The rotation distance to be applied to element 0 is 7 bits, and the rotation distance to be applied to element 1 is 10 bits (1 byte+2 bits). The odd elements are processed first in this example. Again, this is just an example and the even elements could have been processed first instead. The odd elements are shown in bold type in the first row (in the depicted example, there is only one odd element, composed of two bytes). Since the rotation distance applied to element 1 is larger than 1 byte, the bytes of element 1 are output at positions of the mux at a rotated position compared to their input positions, i.e. in contrast to the example described with reference to FIG. 6 in which the bytes of the elements are output at the same output position as their input position, in this case the bytes of the elements are output at an output position that is different from their input position (put another way, in this case each element as a whole is output to the same positions as occupied by the input element, but the bytes within the element occupy different input and output positions). As shown in the second row of FIG. 7 the bytes of element 1 are rotated by one byte. The rotated bytes are shown in bold type in the third row. In addition, the right-most (i.e. lowest, in the FIG. 7 example) byte of the rotated element ("abcdefgh") is copied into the next available output position to the left (i.e. the next available higher output position, in the FIG. 7 example). In this case, since the next output (output 3) is occupied by byte "ijklmnop", the lowest byte is wrapped around and copied into output 0 of the mux. The copied element is shown underlined in the third row. The remaining rotation is then applied by the bitwise shifter. In this example, the remaining shift is 2 bits, as shown in the fourth row of FIG. 7. The copied element is used to rotate the rotated bytes of the element (i.e. the 'gh' bits from the copied element are rotated into element 1). The shifted bytes are shown in bold type in the fifth row. Only the shifted bytes are used for the final result.

The even elements are then processed. The even elements are shown in bold type in the first row of the bottom half of FIG. 7 (in the depicted example, there is only one even element, composed of two bytes). Since the rotation distance is less than one byte (7 bits), the bytes of the even elements are output at a position corresponding to the input position of those bytes. As there is no byte-level rotation, the second row of the bottom half of FIG. 7 indicates a 0 byte rotation, and the bytes output at the same position are shown in bold type in the third row. The right-most (i.e. lowest, in the FIG. 7 example) byte (i.e. byte 0) of the element 0 ("01234567") is copied to the next available output position to the left. In this case, the next available output position is output 2 of the mux since output 1 is occupied. The copied element is shown underlined in the third row of the bottom half of FIG. 7. The bitwise shift is then applied. In this example, the shift is 7 bits, as shown in the fourth row of the bottom half of FIG. 7. The copied element is used to shift the rotated bytes (i.e. the '1234567' bits from the copied element are rotated into element 0). The shifted bytes are shown in bold type in the fourth row. Only the shifted bytes are used for the final result.

Note that FIG. 7 also shows the use of right bitwise shifters to right shift the elements. In contrast, if left bitwise shifters were used to left shift the elements, rather than copying the right-most (i.e. lowest, in the FIG. 7 example) byte of each element into the next available position to the left (i.e. next available higher position, in the FIG. 7 example) of the mux, the left-most (i.e. highest) byte of each element would be copied into the next available position to the right (i.e. next available lower position) of the mux.

To summarise, a vector bitwise rotation instruction is split into two micro-ops, one of which does odd numbered elements, and the other which does even numbered elements. Each micro-op uses the main mux 304 to perform a byte-wise rotation for all the elements being operated on (with rotate distance of floor (shift_distance/8) for left shifts, or (ceil (shift_distance/8)−1) for right shifts) and also copies the new most-extreme byte of each element in the direction of rotation into the next available byte in the direction opposite to the direction of rotation. Put another way, the byte-wise rotation distance is given by the bitwise shift distance, divided by 8, rounded down to the nearest integer (for left shifts) or rounded up to the nearest integer (for right shifts). The bitwise shifts 306 then perform the remaining rotation (with shift distance of 8−(shift_distance modulo 8)), using the copied extra byte to rotate the most-extreme bits of the element in the direction of rotation into the other end of that element.

Note that the examples above consider a 0-based index system starting at 0 nd increasing from right-to-left. However, a 1-based index system starting at 1 may be used instead. Similarly, the direction in which the indices increase can be from left to right.

FIG. 1 shows a computer system in which processing systems described herein may be implemented. The computer system comprises a CPU 902, a GPU 904, a memory 906, a neural network accelerator (NNA) 908 and other devices 914, such as a display 916, speakers 918 and a camera 922. A processing block 910 (corresponding to processing blocks 110) is implemented on the CPU 902. In other examples, one or more of the depicted components may be omitted from the system, and/or the processing block 910 may be implemented on the GPU 904 or within the NNA 908. The components of the computer system can communicate with each other via a communications bus 920. A store 912 (corresponding to store 112) is implemented as part of the memory 906.

The processing system of FIGS. 1-7 are shown as comprising a number of functional blocks. This is schematic only and is not intended to define a strict division between different logic elements of such entities. Each functional block may be provided in any suitable manner. It is to be understood that intermediate values described herein as being formed by a processing system need not be physically generated by the processing system at any point and may merely represent logical values which conveniently describe the processing performed by the processing system between its input and output.

The processing system described herein may be embodied in hardware on an integrated circuit. The processing system described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a processing system configured to perform any of the methods described herein, or to manufacture a processing system comprising any apparatus described herein. An integrated circuit definition dataset may be, for example, an integrated circuit description.

Therefore, there may be provided a method of manufacturing, at an integrated circuit manufacturing system, a processing system as described herein. Furthermore, there may be provided an integrated circuit definition dataset that, when processed in an integrated circuit manufacturing system, causes the method of manufacturing a processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a processing system will now be described with respect to FIG. 2.

Figure 2:
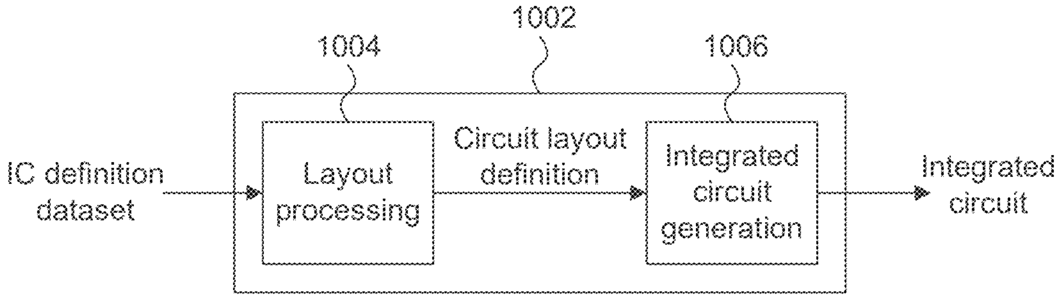
FIG. 2 shows an integrated circuit manufacturing system for generating an integrated circuit embodying a graphics processing system.

FIG. 2 shows an example of an integrated circuit (IC) manufacturing system 1002 which is configured to manufacture a processing system as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a processing system as described in any of the examples herein), process the IC definition dataset, and generate an IC according to the IC definition dataset (e.g. which embodies a processing system as described in any of the examples herein). The processing of the IC definition dataset configures the IC manufacturing system 1002 to manufacture an integrated circuit embodying a processing system as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 2 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 2, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method for performing a vector bitwise rotation, wherein a processing system comprises a byte-wise anything-to-anything mux and one or more bitwise right shifters, wherein the byte-wise anything-to-anything mux comprises a plurality of byte-sized inputs and a plurality of byte-sized outputs, each input being associated with a respective input position and each output being associated with a respective output position, wherein the method comprises processing an instruction to perform a vector bitwise rotation on a vector of elements, each element comprising one or more bytes of data and being associated with a respective even or odd index, wherein the respective index alternates between even and odd for successive elements of the vector, starting with an even index for an initial element of the vector, wherein the instruction specifies a respective rotation distance to be applied to each respective element, and wherein processing the instruction comprises:

inputting the one or more respective bytes of each element to a respective input of the mux;

for each element associated with a respective even index, copying each of the one or more respective bytes of the element to a respective output of the mux based on the respective rotation distance, duplicating a right-most byte of the one or more copied bytes of the element at a respective next available output position to the left or, if a respective output position to the left is unavailable, at a respective available right-most position, and generating a shifted element by applying a respective bitwise shift to the one or more copied bytes using the duplicated right-most byte, wherein the respective bitwise shift is based on the respective rotation distance;

for each element associated with a respective odd index, copying each of the one or more respective bytes of the element to a respective output of the mux based on the respective rotation distance, duplicating a right-most byte of the one or more copied bytes of the element to a respective next available output position to the left or, if a respective output position to the left is unavailable, at a respective available right-most output position, and generating a shifted element by applying a respective bitwise shift to the one or more copied bytes using the duplicated right-most byte, wherein the respective bitwise shift is based on the respective rotation distance; and outputting a resulting sequence of elements using each of the shifted elements.

2. The method of claim 1, further comprising a) first processing the instruction for each element associated with a respective even index, and then processing the instruction for each element associated with a respective odd index, or b) first processing the instruction for each element associated with a respective odd index, and then processing the instruction for each element associated with a respective even index.

3. The method of claim 1, wherein the respective rotation distance for one or more elements is less than one byte, and wherein the respective bitwise shift is equal to the respective rotation distance.

4. The method of claim 1, wherein the respective rotation distance for one or more elements is one byte or more than one byte, and wherein the respective bitwise shift is equal to the respective rotation distance modulo by one byte.

5. The method of claim 1, wherein one or more of the respective rotation distances are the same.

6. The method of claim 1, wherein one or more of the respective rotation distances are different.

7. The method of claim 1, wherein each element consists of a single byte of data.

8. The method of claim 1, wherein each element comprises multiple bytes of data.

9. The method of claim 1, wherein inputting the respective byte of each element comprises supplying the respective byte of each element to the respective inputs of the mux from a register.

10. The method of claim 1, wherein outputting the resulting sequence of elements comprises outputting the resulting sequence of elements to a register.

11. A non-transitory computer readable storage medium having stored thereon computer readable code that, when executed by a computer system, causes the computer system to perform the method as set forth in claim 1.

12. A computer-implemented method for performing a vector bitwise rotation, wherein a processing system comprises a byte-wise anything-to-anything mux and one or more bitwise left shifters, wherein the byte-wise anything-to-anything mux comprises a plurality of byte-sized inputs and a plurality of byte-sized outputs, each input being associated with a respective input position and each output being associated with a respective output position, wherein the method comprises processing an instruction to perform a vector bitwise rotation on a vector of elements, each element comprising one or more bytes of data and being associated with a respective even or odd index, wherein the respective index alternates between even and odd for successive elements of the vector, starting with an even index for an initial element of the vector, wherein the instruction specifies a respective rotation distance to be applied to each respective element, and wherein processing the instruction comprises:

inputting the one or more respective bytes of each element to a respective input of the mux;

for each element associated with a respective even index, copying each of the one or more respective bytes of the element to a respective output of the mux based on the respective rotation distance, duplicating a left-most byte of the one or more copied bytes of the element at a respective next available output position to the right, if a respective output position to the right is unavailable, at a respective available left-most output position, and generating a shifted element by applying a respective bitwise shift to the one or more copied bytes using the duplicated left-most byte, wherein the respective bitwise shift is based on the respective rotation distance;

for each element associated with a respective odd index, copying each of the one or more respective bytes of the element to a respective output of the mux based on the respective rotation distance, duplicating a left-most byte of the one or more copied bytes of the element at a respective next available output position to the right or, if a respective output position to the right is unavailable, at a respective available left-most output position, and generating a shifted element by applying a respective bitwise shift to the one or more copied bytes using the duplicated left-most byte, wherein the respective bitwise shift is based on the respective rotation distance; and outputting a resulting sequence of elements using each of the shifted elements.

13. The method of claim 12, further comprising a) first processing the instruction for each element associated with a respective even index, and then processing the instruction for each element associated with a respective odd index, or b) first processing the instruction for each element associated with a respective odd index, and then processing the instruction for each element associated with a respective even index.

14. A non-transitory computer readable storage medium having stored thereon computer readable code that, when executed by a computer system, causes the computer system to perform the method as set forth in claim 12.

15. A processing system for performing a vector bitwise rotation, wherein the processing system comprises a byte-wise anything-to-anything mux and one or more bitwise right shifters, wherein the byte-wise anything-to-anything mux comprises a plurality of byte-sized inputs and a plurality of byte-sized outputs, each input being associated with a respective input position and each output being associated with a respective output position, and wherein:

the processing system is configured to process an instruction to perform a vector bitwise rotation on a vector of elements, each element comprising one or more bytes of data and being associated with a respective even or odd index, wherein the respective index alternates between even and odd for successive elements of the vector, starting with an even index for an initial element of the vector, wherein the instruction specifies a respective rotation distance to be applied to each respective element;

the processing system is configured to input the one or more respective bytes of each element to a respective input of the mux;

for each element associated with a respective even index:

the mux is configured to copy each of the one or more respective bytes of the element to a respective output of the mux based on the respective rotation distance, and duplicate a right-most byte of the copied bytes to a respective next available output position to the left or, if a respective output position to the left is unavailable, at a respective available right-most position, and each bitwise shifter is configured to generate a shifted element by applying a respective bitwise shift to the copied bytes using the duplicated right-most byte, wherein the respective bitwise shift is based on the respective rotation distance; and for each element associated with a respective odd index:

the mux is configured to copy each of the one or more respective bytes of the element to a respective output of the mux based on the respective rotation distance, and duplicate a right-most byte of the copied bytes to a respective next available output position to the left or, if a respective output position to the left is unavailable, at a respective available right-most position, and each bitwise shifter is configured to generate a shifted element by applying a respective bitwise shift to the copied bytes using the duplicated right-most byte, wherein the respective bitwise shift is based on the respective rotation distance; and wherein the processing system is configured to output a resulting sequence of elements using each of the shifted elements.

16. The processing system of claim 15, wherein the processing system is embodied in hardware on an integrated circuit.

17. A method of manufacturing, using an integrated circuit manufacturing system, the processing system as set forth in claim 15, the method comprising:

processing, using a layout processing system, a computer readable dataset description of the processing system so as to generate a circuit layout description of an integrated circuit embodying the processing system; and manufacturing, using an integrated circuit generation system, the processing system according to the circuit layout description.

18. A processing system for performing a vector bitwise rotation, wherein the processing system comprises a byte-wise anything-to-anything mux and one or more bitwise left shifters, wherein the byte-wise anything-to-anything mux comprises a plurality of byte-sized inputs and a plurality of byte-sized outputs, each input being associated with a respective input position and each output being associated with a respective output position, and wherein:

the processing system is configured to process an instruction to perform a vector bitwise rotation on a vector of elements, each element comprising one or more bytes of data and being associated with a respective even or odd index, wherein the respective index alternates between even and odd for successive elements of the vector, starting with an even index for an initial element of the vector, wherein the instruction specifies a respective rotation distance to be applied to each respective element;

the processing system is configured to input the one or more respective bytes of each element to a respective input of the mux;

for each element associated with a respective even index:

the mux is configured to copy each of the one or more respective bytes of the element to a respective output of the mux based on the respective rotation distance, and duplicate a left-most byte of the one or more copied bytes of the element at a respective next available output position to the right or, if a respective output to the right is unavailable, at a respective available left-most output position, and each bitwise shifter is configured to generate a shifted element by applying a respective bitwise shift to the copied bytes using the duplicated left-most byte, wherein the respective bitwise shift is based on the respective rotation distance; and for each element associated with a respective odd index:

the mux is configured to copy each of the one or more respective bytes of the element to a respective output of the mux based on the respective rotation distance, and duplicate a left-most byte of the one or more copied bytes of the element at a respective next available output position to the right or, if a respective output position to the right is unavailable, at a respective available left-most output position, and each bitwise shifter is configured to generate a shifted element by applying a respective bitwise shift to the copied bytes using the duplicated left-most byte, wherein the respective bitwise shift is based on the respective rotation distance; and wherein the processing system is configured to output a resulting sequence of elements using each of the shifted elements.

19. The processing system of claim 18, wherein the processing system is embodied in hardware on an integrated circuit.

20. A method of manufacturing, using an integrated circuit manufacturing system, the processing system as set forth in claim 18, the method comprising:

processing, using a layout processing system, a computer readable description of the processing system so as to generate a circuit layout description of an integrated circuit embodying the processing system; and manufacturing, using an integrated circuit generation system, the processing system according to the circuit layout description.

* * * * *